United States Patent
Atsumi et al.

(10) Patent No.: US 8,672,807 B2
(45) Date of Patent: Mar. 18, 2014

(54) SPEED-CHANGING DEVICE

(71) Applicant: Panasonic Corporation, Osaka (JP)

(72) Inventors: Masatoshi Atsumi, Shiga (JP);
Kenichirou Inagaki, Osaka (JP);
Hiroyuki Kaizo, Kyoto (JP); Tadashi Arimura, Kyoto (JP); Yutaka Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/677,580

(22) Filed: Nov. 15, 2012

(65) Prior Publication Data

US 2014/0045653 A1    Feb. 13, 2014

(30) Foreign Application Priority Data

Nov. 21, 2011 (JP) ................. 2011-254462

(51) Int. Cl.
*F16H 59/78* (2006.01)
*B60W 10/08* (2006.01)
*B60W 10/10* (2012.01)

(52) U.S. Cl.
USPC ............................. 477/98; 477/115

(58) Field of Classification Search
CPC .... F16H 59/78; F16H 61/0213; B60W 10/08; B60W 10/10
USPC ................................... 477/98, 115
See application file for complete search history.

(56) References Cited

U.S. PATENT DOCUMENTS

| | | | |
|---|---|---|---|
| 6,014,604 A * | 1/2000 | Kuroiwa et al. | 701/54 |
| 6,424,799 B1 | 7/2002 | Gilmore | |
| 6,468,182 B1 * | 10/2002 | Brandt et al. | 477/98 |
| 7,334,648 B2 * | 2/2008 | Arimura | 173/179 |
| 2009/0071671 A1 | 3/2009 | Zhong et al. | |
| 2009/0071673 A1 | 3/2009 | Zhong et al. | |
| 2011/0162861 A1 | 7/2011 | Borinato et al. | |

FOREIGN PATENT DOCUMENTS

| | | |
|---|---|---|
| EP | 0 281 775 A2 | 9/1988 |
| EP | 1 878 541 A1 | 1/2008 |
| EP | 2 281 650 A1 | 2/2011 |
| JP | 59-49873 A | 12/1984 |
| JP | 63-221980 A | 9/1988 |
| JP | 2002-224972 A | 8/2002 |
| JP | 2004-009284 A | 1/2004 |
| JP | 2009-056590 A | 3/2009 |
| JP | 2009-078349 A | 4/2009 |

OTHER PUBLICATIONS

European Search Report for corresponding European Application No. 12192002.9 dated Feb. 14, 2013.

* cited by examiner

*Primary Examiner* — Edwin A Young
(74) *Attorney, Agent, or Firm* — Renner, Otto, Boisselle & Sklar, LLP (57) ABSTRACT

A speed-changing device includes a motor, a reduction gear train that reduces a rotation speed of the motor in accordance with a speed reduction ratio and transmits the rotation at the reduced speed, and a speed reduction ratio switching unit that switches the speed reduction ratio. The speed reduction ratio switching unit includes an actuator that switches the speed reduction ratio, a controller that controls the actuator, and a drive state detector that detects an index value representing load torque applied to the motor. The controller activates the actuator when the index value exceeds a first threshold value and activates the actuator when the index value fluctuates between the first threshold and a second threshold thereby forming an undulated pattern that satisfies a predetermined condition.

8 Claims, 6 Drawing Sheets

SPEED-CHANGING DEVICE

CROSS-REFERENCE TO RELATED APPLICATIONS

This application is based upon and claims the benefit of priority from prior Japanese Patent Application No. 2011-254462, filed on Nov. 21, 2011, the entire contents of which are incorporated herein by reference.

BACKGROUND ART

The present invention relates to a speed-changing device that switches the speed reduction ratio and is used in a power tool.

Japanese Laid-Open Patent Publication No. 2009-56590 describes a power tool including a reduction gear train that switches speed reduction ratios. The power tool automatically switches the speed reduction ratio of the reduction gear unit in accordance with the load torque applied to a motor.

The power tool detects the load torque from the current value of the motor. When the detected current value is greater than a predetermined value for a fixed time, the power tool switches the speed reduction ratio of the reduction gear train to lower the rotation speed of the motor. This prevents the temperature of the motor from suddenly increasing.

When the power tool is continuously used in a state in which the detected current value of the motor is slightly lower than the predetermined value, the speed reduction ratio of the reduction gear train is not switched. As a result, this may suddenly increase the motor temperature and heat the power tool thereby lowering workability.

SUMMARY OF THE INVENTION

One aspect of the present invention is a speed-changing device including a motor, a reduction gear train that reduces a rotation speed of the motor in accordance with a speed reduction ratio and transmits the rotation at the reduced speed, and a speed reduction ratio switching unit that switches the speed reduction ratio. The speed reduction ratio switching unit includes an actuator that switches the speed reduction ratio, a controller that controls the actuator, and a drive state detector that detects an index value representing load torque applied to the motor. The controller activates the actuator when the index value exceeds a first threshold value, and the controller activates the actuator when the index value fluctuates between the first threshold and a second threshold, which differs from the first threshold value, thereby forming an undulated pattern that satisfies a predetermined condition.

A further aspect of the present invention is a speed-changing device including a motor, a reduction gear train that reduces a rotation speed of the motor in accordance with a speed reduction ratio and transmits the rotation at the reduced speed, a speed reduction ratio switching unit that switches the speed reduction ratio, and a temperature sensor that detects the temperature of the motor. The speed reduction ratio switching unit includes an actuator that switches the speed reduction ratio, a controller that controls the actuator, and a drive state detector that detects an index value representing load torque applied to the motor. The controller activates the actuator when the index value exceeds a first threshold value, and the controller activates the actuator when the index value fluctuates between the first threshold and a second threshold, which differs from the first threshold value, thereby forming an undulated pattern and, at the same time, the temperature detected by the temperature sensor reaches a predetermined temperature at which the motor would be abnormally heated.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

Embodiments of the present invention will now be described with reference to the accompanying drawings.

Figure 2:
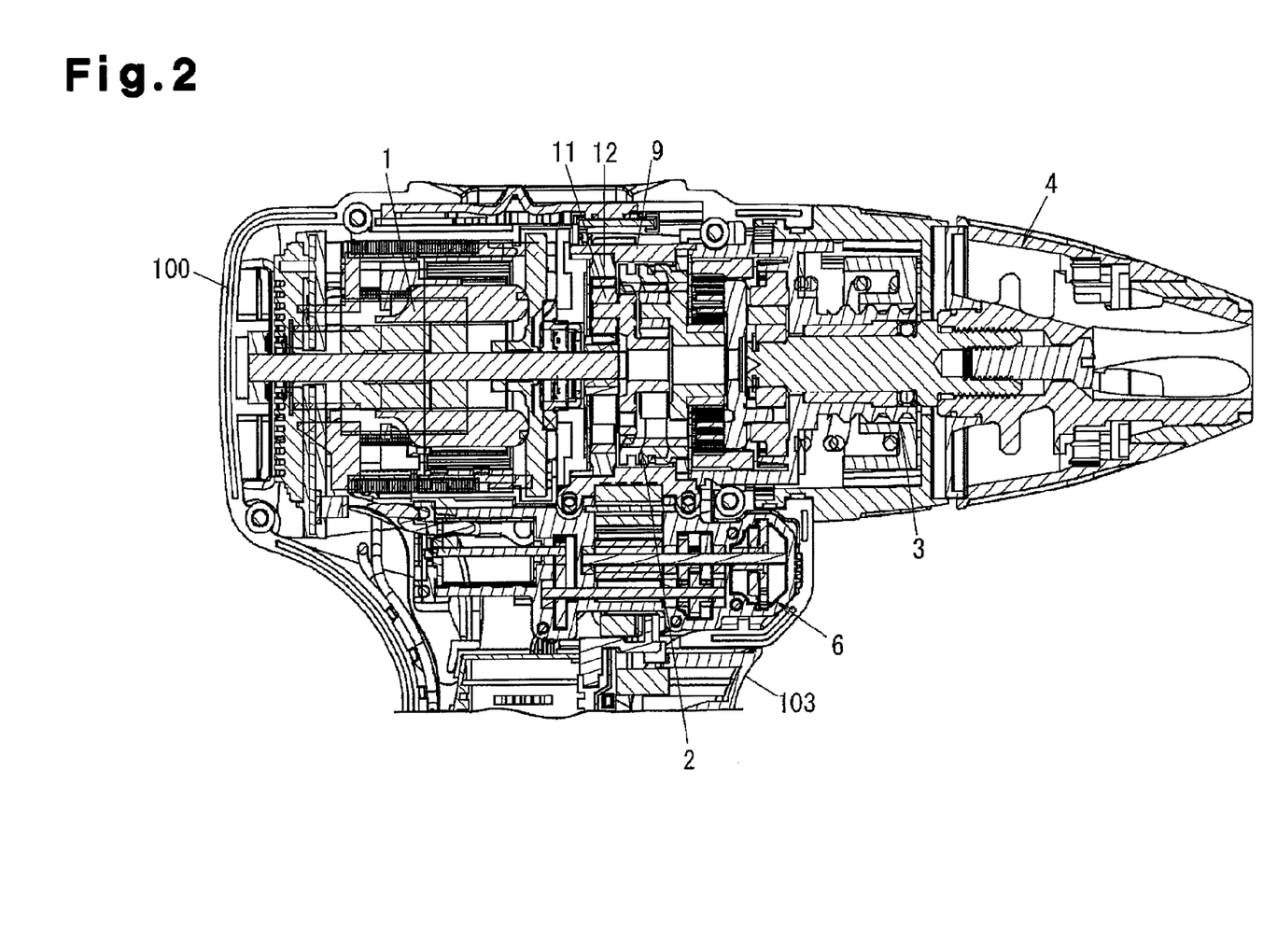
FIG. 2 is a cross-sectional view showing a main part of a power tool including the speed-changing device of the first embodiment.
Figure 3:
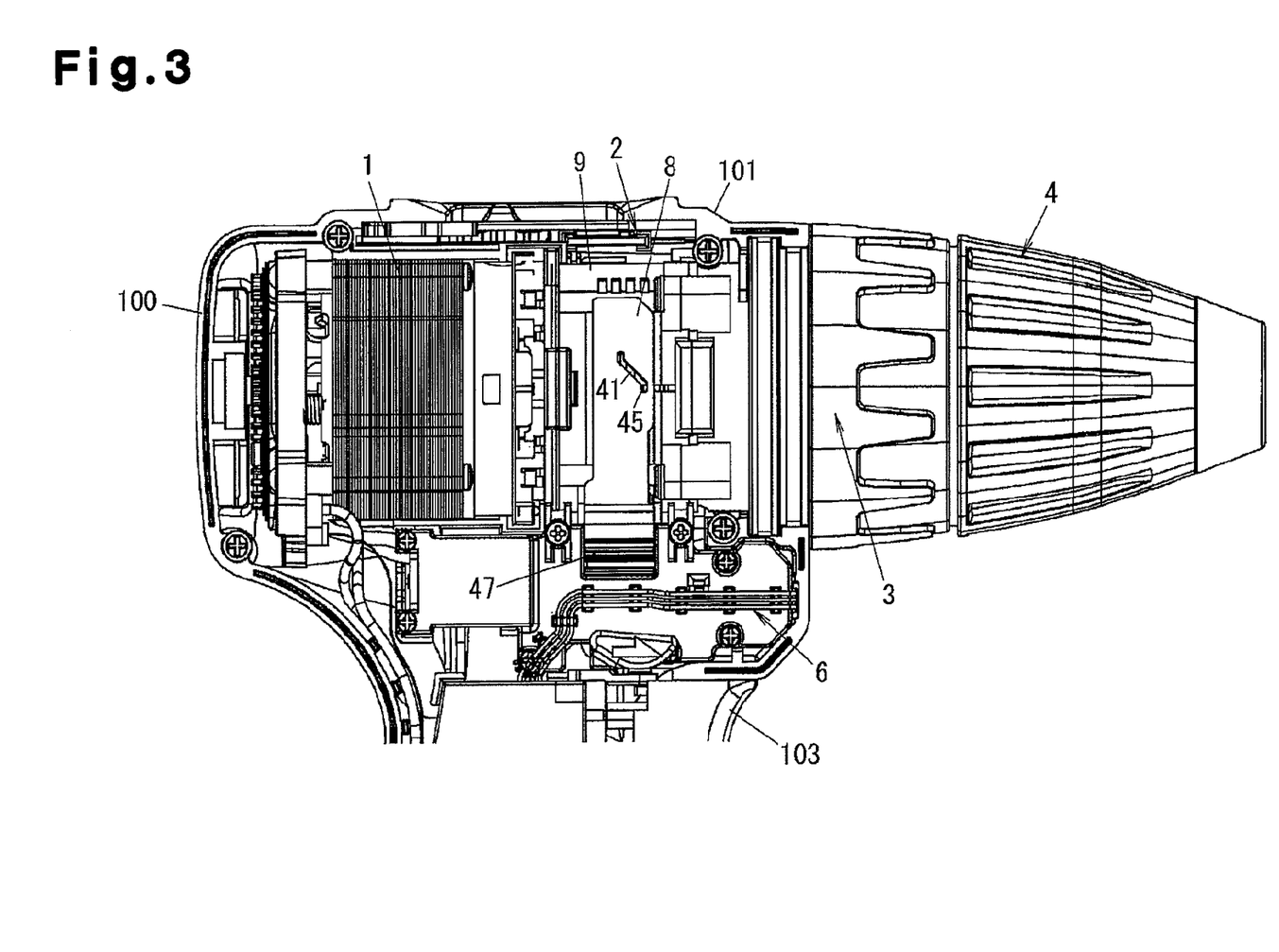
FIG. 3 is an inner side view showing the main part of the power tool including the speed-changing device of the first embodiment.

FIGS. 2 and 3 show one example of a power tool including a speed-decreasing device according to a first embodiment of the present invention. The power tool includes a motor 1 arranged in a rear part of a housing 100. The motor 1 serves as a drive source. The output of the motor 1 is transmitted by a reduction gear train 2 and a drive transmission unit 3 to an output shaft 4. The housing 100 includes a grip on which a trigger switch 103 is arranged. Operation of the trigger switch 103 drives and produces rotation with the motor 1.

The reduction gear train 2 includes three planetary gears arranged in series in the axial direction. The second planetary gear, namely, a ring gear 12, is movable in an axial direction. When moved toward the rear of the power tool (leftward as viewed in FIG. 2), the ring gear 12 is engaged with the teeth arranged on the outer circumferential surface of a carrier 11 on the first planetary gear. When moved toward the front of the power tool (rightward as viewed in FIG. 2), the ring gear 12 is engaged with the inner circumferential surface of a gear case 9. In this manner, when the ring gear 12 is moved toward the left as viewed in FIG. 2, the second planetary gear does not function as part of the gear train, and the first planetary gear is directly connected to the third planetary gear. This transmits low-speed high torque rotation to the output shaft 4.

A rotary type actuator 6 and a speed-changing ring 8 are used to switch the speed reduction ratio. Rotation of the actuator 6 is transmitted by a gear 47 to the speed-changing ring 8. This rotates the speed-changing ring 8 and moves the ring gear 12. The speed-changing ring 8 is rotatable about its axis and movable in the axial direction. Further, the speed-changing ring 8 is directly connected to the ring gear 12 and includes a cam groove 41, which is engaged with a pin 45 that projects from the gear case 9. When the rotation of the actuator 6 rotates the speed-changing ring 8, the speed-changing ring 8 is moved in the axial direction guided by the pin 45 and the cam groove 41. The axial movement of the speed-changing ring 8 moves the ring gear 12 in the axial direction and changes speeds.

Figure 1:
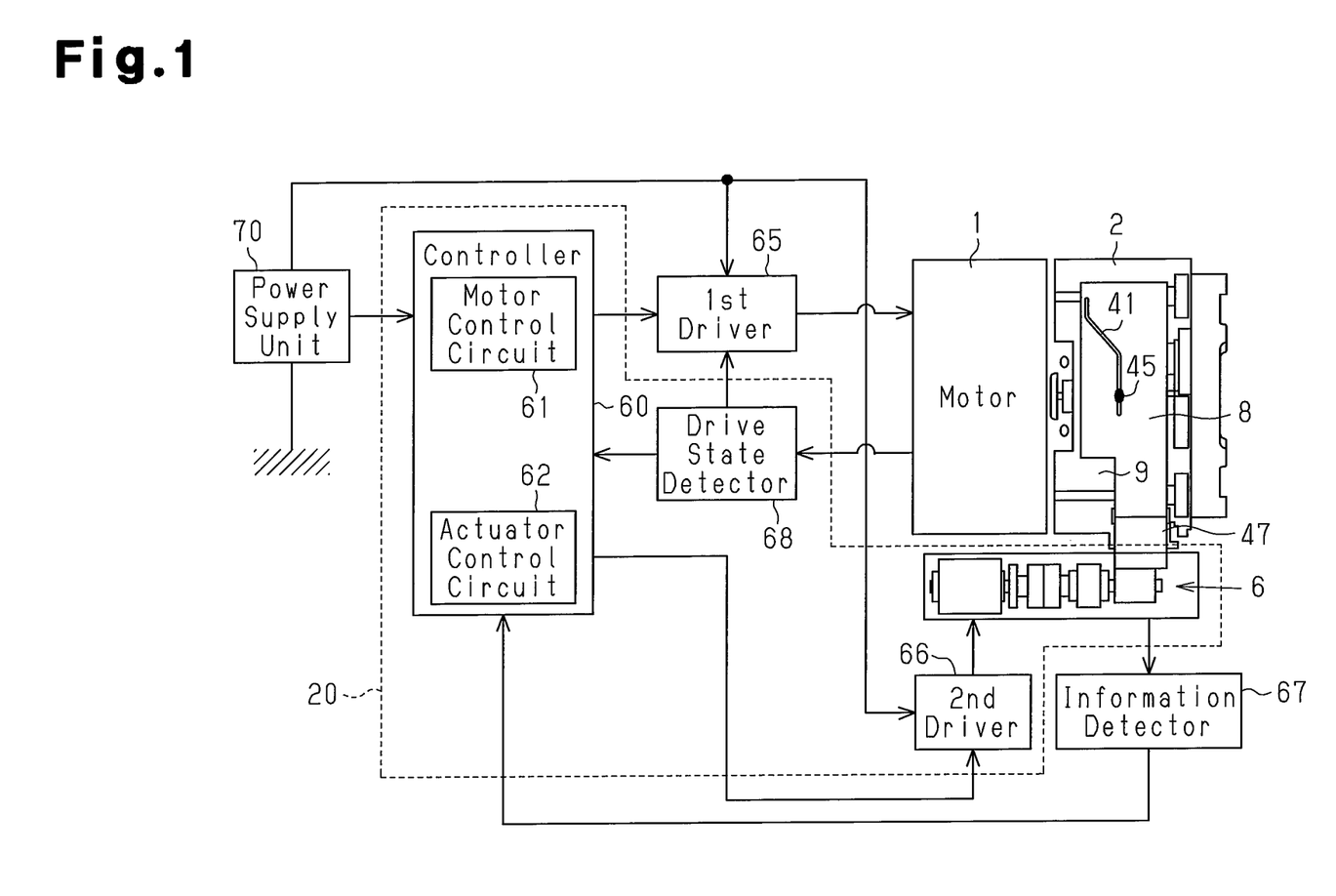
FIG. 1 is a schematic diagram of a speed-changing device according to a first embodiment of the present invention.

FIG. 1 is a block diagram of the power tool. The power tool includes a controller 60, a power supply unit 70, a first driver 65, a second driver 66, an information detector 67, and a drive state detector 68. The controller 60 includes a motor control circuit 61, which drives the motor 1 with the first driver 65, and an actuator control circuit 62, which controls the rotation of the actuator 6 with the second driver 66. The drive state detector 68 feeds back the rotation of the motor 1 to the controller 60, and the information detector 67 feeds back the rotation of the actuator 6 to the controller 60. The actuator 6, the second driver 66, the drive state detector 68, and the controller 60 form a speed reduction ratio switching unit 20.

The drive state detector 68 detects an index value that represents the load torque applied to the motor 1. In the present embodiment, the value of the current that flows through the motor 1 is used as an index value. The index value may be the rotation speed of the motor 1. Further, the index value may be determined by two more variables that represent the drive state of the motor 1 (e.g., motor current value and motor rotation speed). The drive state detector 68 may directly detect the load torque applied to the motor 1, and the detected load torque may be used as an index value.

When the trigger switch 103 goes on, the controller 60 activates the motor 1 in a state in which the speed reduction ratio of the reduction gear train 2 is set to a small value. In accordance with the drive state of the motor 1 detected by the drive state detector 68, the controller 60 performs automatic speed-changing control by activating the actuator 6 with the second driver 66 and moving the ring gear 12 in the axial direction to change the speed reduction ratio of the reduction gear train 2 to a large value. The automatic speed-changing control is performed in a state in which the trigger switch 103 is on.

Figure 4:
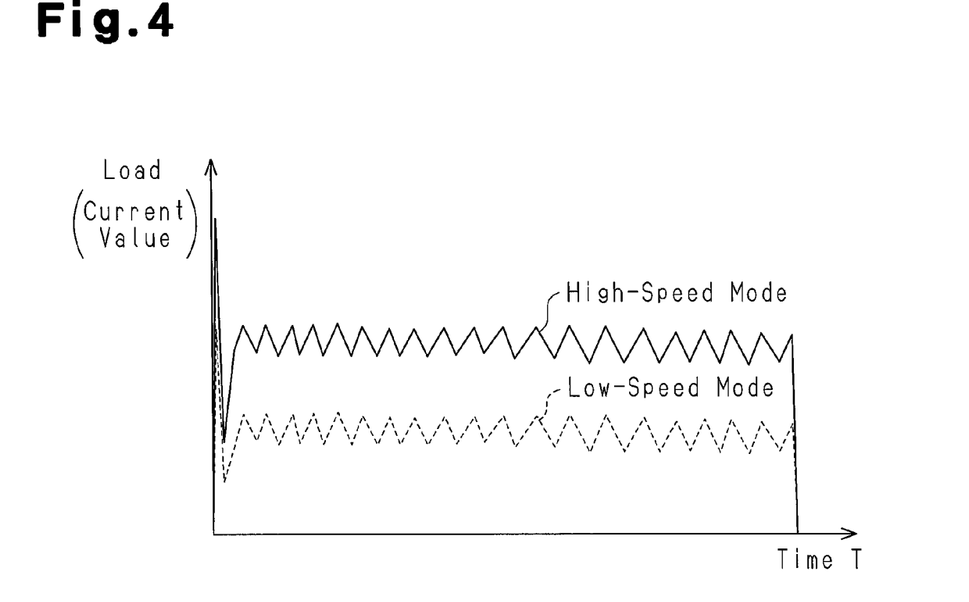
FIG. 4 is a chart showing changes in the load torque relative to time during a high-speed mode and a low-speed mode of the speed-changing device in the first embodiment.

When rotating a drill bit with the power tool such as when drilling a hole in a workpiece, as shown in FIG. 4, the current value of the motor 1 fluctuates within a generally fixed width after a predetermined time elapses. In the drawing, the high-speed mode represents the mode current value when a small value is set as the speed-reduction ratio of the reduction gear train 2. Further, the low-speed mode represents the motor current value when a large value is set as the speed-reduction ratio of the reduction gear train 2.

When drilling is performed in the high-speed mode and the bit gets caught in the workpiece, the current value of the motor 1 detected by the drive state detector 68 may continuously become greater than a first threshold L1 during a pre-determined period (first state). The first threshold L1 is a reference value at when the motor 1 shifts to an overload state.

In such a case, in the speed changing device of the present embodiment, the controller 60 performs the automatic speed changing control that activates the actuator 6 and changes the speed reduction ratio of the reduction gear train 2 to a large value. This reduces the load on the motor 1 and prevents the temperature of the motor 1 from suddenly increasing.

Figure 5:
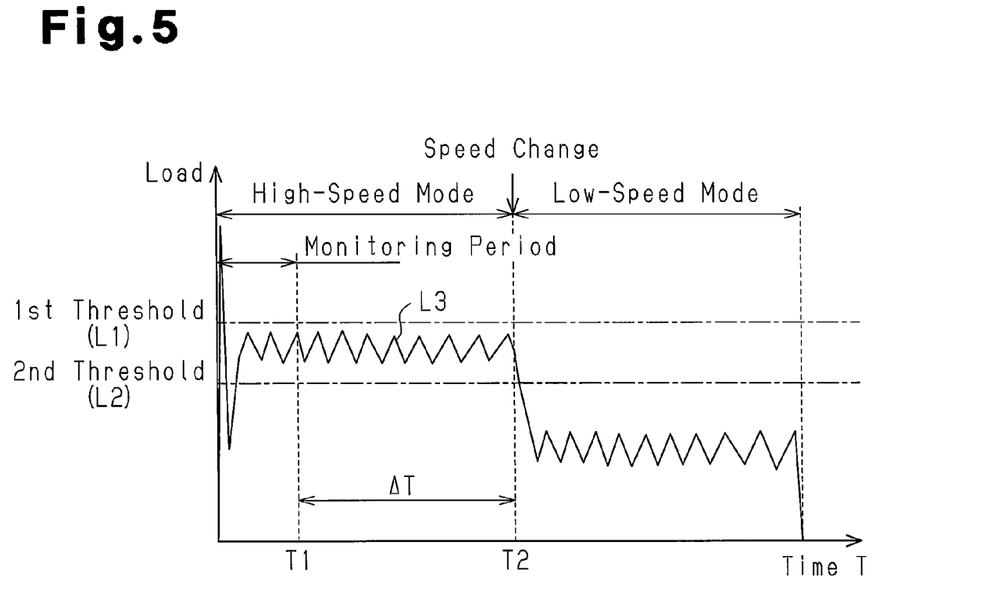
FIG. 5 is a chart showing the switching of the speed reduction ratio in the speed-changing device of the first embodiment.

Further, in the present embodiment, as shown in FIG. 5, the detected motor current value may fluctuate between the first threshold L1 and a second threshold L2 and form an undulated pattern L3. The automatic speed-changing control is also performed when the undulated pattern L3 satisfies a predetermined condition (second state). The range between the first threshold L1 and the second threshold L2 defines an overload range in which the temperature of the motor 1 may suddenly rise when the motor 1 is continuously used. In the present embodiment, the current value of the motor 1 that is proportional to the load torque is used as an index value. Thus, the second threshold L2 is a smaller value than the first threshold L1. When the rotation speed of the motor 1 that is proportional to the load torque is used as the index value, the second threshold L2 is a larger value than the first threshold L1.

In the present embodiment, the predetermined condition for the second state is in that a fixed time $\Delta T$ elapses from when a stable undulated pattern L3 is formed between the first threshold L1 and the second threshold L2. In the present embodiment, a stable undulated pattern L3 is formed at time point T1, which is when T1 seconds elapses from when the driving of the motor 1 starts (T=0), that is, when a monitoring period elapses during which the fluctuation width of the motor current value is instable. At time point T1, the undulated pattern L3 is formed with a generally constant width between the first threshold L1 and the second threshold L2.

In this manner, in the present embodiment, the automatic speed-changing control is performed at time point T2 after the fixed time $\Delta T$ elapses from time point T1, which is when the stable undulated pattern L3 is formed between the first threshold L1 and the second threshold L2.

As described above, by performing the automatic speed-changing control, the load applied to the motor 1 can be reduced not only when the detected current value of the motor 1 exceeds the first threshold value L but also when the detected current value is in the overload range between the first threshold L1 and second threshold L2. This suppresses heating of the power tool and ensures the workability. Further, in the present embodiment, the automatic speed-changing control is performed based on the elapsed time. Thus, the current value of the motor 1 does not have to be continuously detected from after time point T1, and the automatic speed-changing control of the actuator 6 is not affected by detection errors in the current value of the motor 1.

Other embodiments of a speed-changing device according to the present invention will now be described. Components that are the same as the corresponding components of the first embodiment will not be described in detail. Components that differ from the first embodiment will be described in detail.

Figure 6:
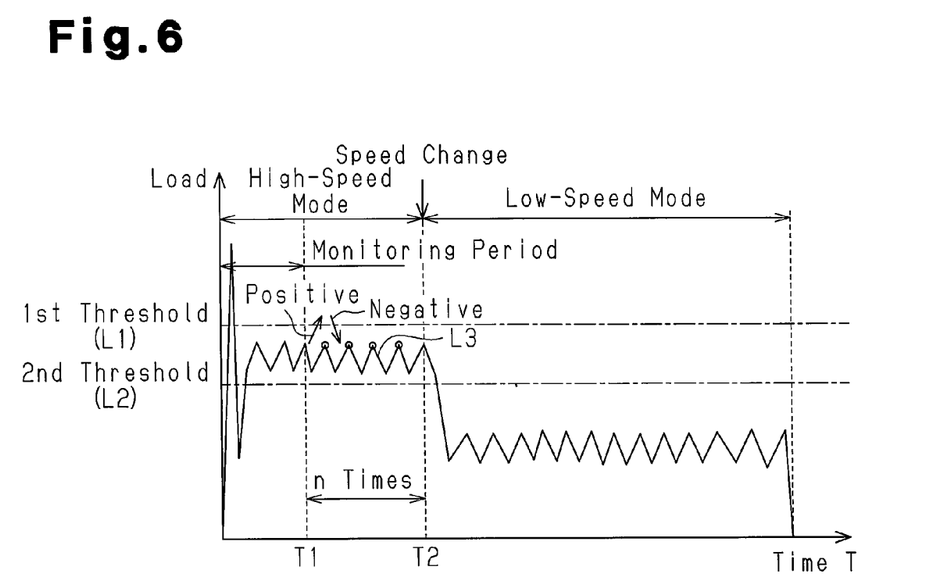
FIG. 6 is a chart showing the switching of the speed reduction ratio in a speed-changing device according to a second embodiment of the present invention.

In the second embodiment, referring to FIG. 6, the predetermined condition for the second state is in that the number of oscillations in the undulated pattern L3 reaches a predetermined number n. In the second embodiment, from time point T1, which is when the monitoring period elapses, the number of peaks in the undulated pattern L3 at which a positive gradient shifts to a negative gradient is counted. When the count number reaches the predetermined number n, the automatic speed-changing control is performed. In the second embodiment, the detected current value of the motor 1 is fed back to the controller 60, and the controller 60 counts the number of oscillations in the undulated pattern L3.

By performing automatic speed-changing control in this manner, the load applied to the motor 1 can be reduced and the workability can be ensured not only when the detected current value of the motor 1 exceeds the first threshold value L but also when the detected current value is in the overload range between the first threshold L1 and second threshold L2. Further, the number of tasks until the automatic speed-changing control is performed is fixed by the count number. Thus, the reaction force of the tool stably acts on the operator, and the workability is good. Further, in the present embodiment, the oscillation number of the undulated pattern L3 is counted. Thus, the automatic speed-changing control of the actuator 6 is not affected by detection errors in the current value of the motor 1.

Figure 7:
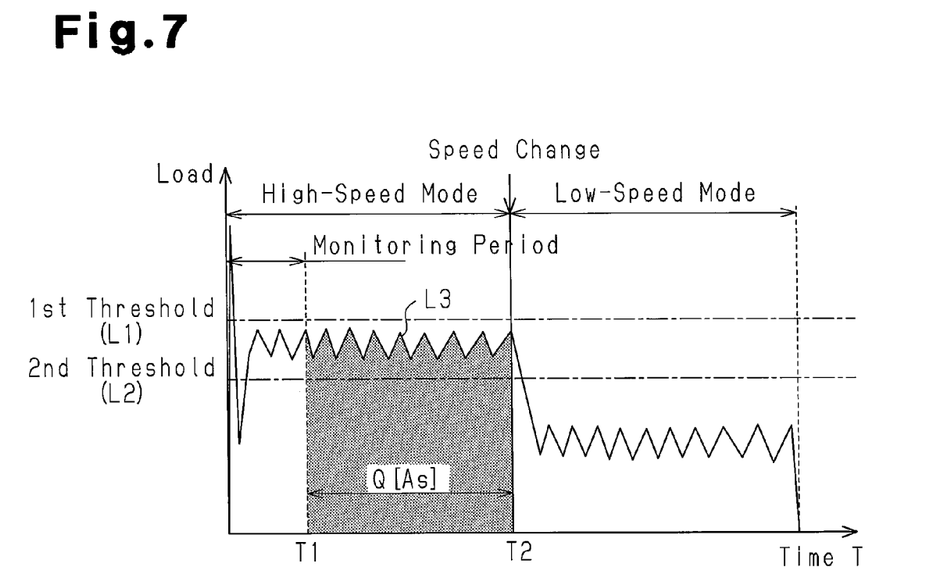
FIG. 7 is a chart showing the switching of the speed reduction ratio in a speed-changing device according to a third embodiment of the present invention.

In a third embodiment, referring to FIG. 7, the predetermined condition of the second state is in that the integrated value obtained by integrating the undulated pattern L3 formed from time T1 with time reaches a predetermined integrated value Q. When this condition is satisfied, the automatic speed-changing control is performed. In the third embodiment, the controller 60, which receives the fed back detected current value of the motor 1, counts the integrated value.

By performing the automatic speed-changing control in this manner, the load applied to the motor 1 can be reduced and the workability can be ensured not only when the detected current value of the motor 1 exceeds the first threshold value L but also when the detected current value is in the overload range between the first threshold L1 and second threshold L2. Further, in the present embodiment, the number of tasks until the automatic speed-changing control is performed is fixed by the count number (integrated value). Thus, the reaction force of the tool stably acts on the operator, and the workability is good. Additionally, in the present embodiment, the integrated value of the undulated pattern L3 is counted. This allows for further accurate detection of the load state of the motor 1 in accordance with the fluctuation of the motor current value. Thus, for example, when the motor current value remains slightly higher than the second threshold L2, the task performed in the high-speed mode can be continued for a longer time than when the motor current value remains slightly lower than the first threshold value L1.

The predetermined conditions of the first to third embodiments may be combined and be used as predetermined conditions for the second state.

Figure 8:
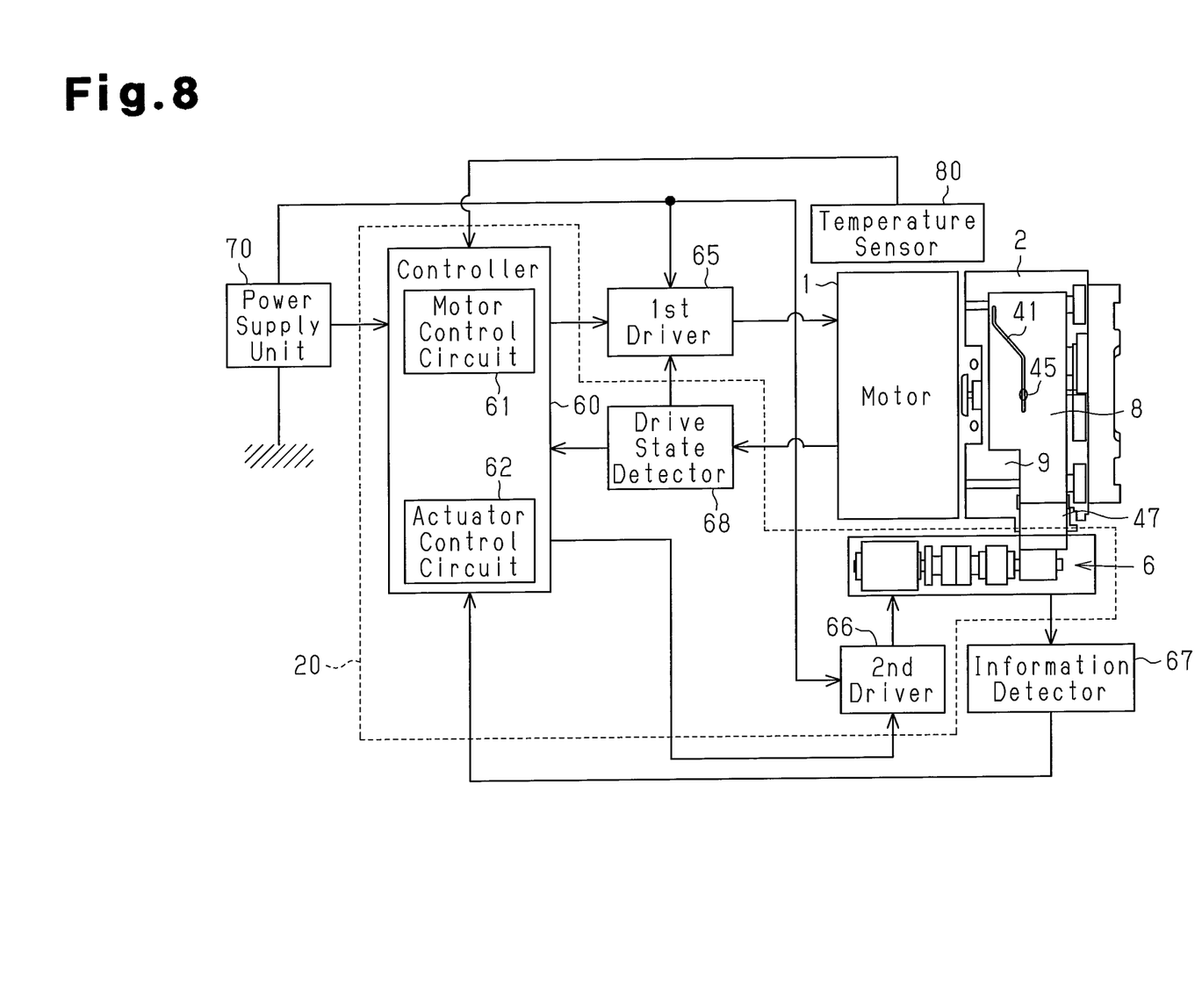
FIG. 8 is a diagram showing a speed-changing device according to a fourth embodiment of the present invention.

A fourth embodiment will now be described. In the fourth embodiment, the automatic speed-changing control is performed when the current value of the motor 1 detected by the drive state detector 68 fluctuates between the first threshold L1 and the second threshold L2 thereby forming the undulated pattern L3 and the temperature of the motor 1 reaches a predetermined temperature B, at which the motor 1 would be abnormally heated. A temperature sensor 80, which is shown in FIG. 8, is arranged in the speed-changing device to detect the temperature of the motor 1.

By performing the automatic speed-changing control in this manner, the load applied to the motor 1 can be reduced and the workability can be ensured not only when the detected current value of the motor 1 exceeds the first threshold value L but also when the detected current value is in the overload range between the first threshold L1 and second threshold L2. Further, in the present embodiment, the temperature of the motor 1 is directly detected to perform the automatic speed-changing control. Thus, the load state of the motor 1 can be directly detected, and the automatic speed-changing control of the actuator 6 can be performed with further accuracy. This ensures that the load applied to the motor 1 is reduced.

In the first to third embodiments, the speed-changing device includes the motor 1, which is used as the drive source, the reduction gear train 2, which reduces the speed of the rotation generated by the motor 1 in accordance with a certain speed reduction ratio and transmits the rotation at the reduced speed, and the speed reduction ratio switching unit 20, which switches the speed reduction ratio. The speed reduction ratio switching unit 20 includes the actuator 6, which switches the speed reduction ratio, the controller 60, which controls the actuator 6, and the drive state detector 68, which detects an index value representing the load torque applied to the motor 1. The controller 60 activates the actuator 6 when the index value exceeds the first threshold value L1. Further, the controller 60 activates the actuator 6 when the index value fluctuates between the first threshold L1 and the second threshold L2, which differs from the first threshold L1, thereby forming the undulated pattern L3 and, at the same time, the undulated pattern L3 satisfies the predetermined condition.

As a result, in the speed-changing devices of the first to third embodiments, the output of the motor 1 is weakened not only when the detected index value of the motor 1 exceeds the first threshold value L but also when the detected index value is between the first threshold L1 and second threshold L2. In other words, even when the motor 1 is continuously used in a state in which the detected index value is slightly lower than a predetermined value, the speed reduction ratio of the reduction gear train 2 can be switched. This prevents the temperature of the motor 1 from suddenly increasing and thereby ensures workability.

In the speed-changing device of the first embodiment, the predetermined condition is in that the fixed time ΔT elapses from the time point when the stable undulated pattern L3 is formed.

Thus, in the speed-changing device of the first embodiment, after determining that the undulated pattern L3 has been stably formed, the detection of the index value does not have to be continued, and the automatic speed-changing control of the actuator 6 is not affected by detection errors in the index value.

Further, in the speed-changing device of the second embodiment, the predetermined condition is in that the number of oscillations in the undulated pattern L3 reaches a predetermined number n. In the speed-changing device of the third embodiment, the predetermined condition is in that the integrated value obtained by integrating the undulated pattern L3 with time reaches the predetermined integrated value Q.

In this manner, the number of tasks until the automatic speed-changing control is performed is fixed by the count number. Thus, the reaction force of the tool stably acts on the operator, and the workability is good.

In the speed-changing device of the first to fourth embodiments, the current value of the motor 1 is preferred as the index value.

In this manner, the load torque applied to the motor 1 can be accurately detected. Further, the accurate detection can be achieved with an inexpensive circuit configuration.

Further, in the speed-changing device of the first to fourth embodiments, the rotation speed of the motor 1 is preferred as the index value.

In this manner, the load torque applied to the motor 1 can be accurately detected without being affected by noise caused by the current detector that detects the current value of the motor 1 like when the index value is the current value of the motor 1.

Moreover, in the speed-changing device of the first to fourth embodiments, it is preferred that the index value be determined by two or more variables that represent the drive state of the motor.

This decreases the influence of variations in the thresholds caused by variations between components. Thus, the index value becomes highly accurate, and further stable workability can be obtained.

As shown in FIG. 8, the speed-changing device of the fourth embodiment includes the motor 1, which is used as the drive source, the reduction gear train 2, which reduces the speed of the rotation generated by the motor 1 in accordance with a certain speed reduction ratio and transmits the rotation at the reduced speed, the speed reduction ratio switching unit 20, which switches the speed reduction ratio, and the temperature sensor 80, which detects the temperature of the motor 1. The speed reduction ratio switching unit 20 includes the actuator 6, which switches the speed reduction ratio, the controller 60, which controls the actuator 6, and the drive state detector 68, which detects an index value representing the load torque applied to the motor 1. The controller 60 activates the actuator 6 when the index value exceeds the first threshold value L1. Further, the controller 60 activates the actuator 6 when the index value fluctuates between the first threshold L1 and the second threshold L2, which differs from the first threshold L1, thereby forming the undulated pattern L3 and, at the same time, the temperature of the motor 1 detected by the temperature sensor 80 reaches a predetermined temperature at which the motor 1 would be abnormally heated.

As a result, in the speed-changing devices of the fourth embodiment, the output of the motor 1 is weakened not only when the detected index value of the motor 1 exceeds the first threshold value L but also when the detected index value is between the first threshold L1 and second threshold L2. In the speed-changing device of the fourth embodiment, the temperature of the motor 1 is detected by the temperature sensor 80. Thus, the temperature of the motor 1 is directly detected to check whether it has reached a predetermined temperature at which it would be abnormally heated. This obtains high detection accuracy. Accordingly, in the speed-changing device of the fourth embodiment, even when the motor 1 is continuously used in a state in which the detected index value is slightly lower than a predetermined value, the speed reduction ratio of the reduction gear train 2 can be switched. This prevents the temperature of the motor 1 from suddenly increasing and thereby ensures workability.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims. Further, the application of the speed-changing device according to the present invention is not limited to power tools.

The invention claimed is:

1. A speed-changing device comprising:
   a motor;
   a reduction gear train that reduces a rotation speed of the motor in accordance with a speed reduction ratio and transmits the rotation at the reduced speed; and
   a speed reduction ratio switching unit that switches the speed reduction ratio, wherein the speed reduction ratio switching unit includes
      an actuator that switches the speed reduction ratio,
      a controller that controls the actuator, and
      a drive state detector that detects an index value representing load torque applied to the motor,
   wherein the controller activates the actuator when the index value exceeds a first threshold value, and
   the controller activates the actuator when the index value fluctuates between the first threshold and a second threshold, which differs from the first threshold value, thereby forming an undulated pattern that satisfies a predetermined condition.

2. The speed-changing device according to claim 1, wherein the predetermined condition includes a predetermined time elapsing from a time point when the undulated pattern is stably formed.

3. The speed-changing device according to claim 1, wherein the predetermined condition includes a number of oscillations in the undulated pattern reaching a predetermined number.

4. The speed-changing device according to claim 1, wherein the predetermined condition includes an integrated value, which is obtained by integrating the undulated pattern with time, reaching a predetermined integrated value.

5. The speed-changing device according to claim 1, wherein the index value is a current value of the motor.

6. The speed-changing device according to claim 1, wherein the index value is a rotation speed of the motor.

7. The speed-changing device according to claim 1, wherein the index value is determined by two or more variables representing a drive state of the motor.

8. A speed-changing device comprising:
   a motor;
   a reduction gear train that reduces a rotation speed of the motor in accordance with a speed reduction ratio and transmits the rotation at the reduced speed;
   a speed reduction ratio switching unit that switches the speed reduction ratio; and
   a temperature sensor that detects the temperature of the motor,
   wherein the speed reduction ratio switching unit includes
      an actuator that switches the speed reduction ratio,
      a controller that controls the actuator, and
      a drive state detector that detects an index value representing load torque applied to the motor,
   wherein the controller activates the actuator when the index value exceeds a first threshold value, and
   the controller activates the actuator when the index value fluctuates between the first threshold and a second threshold, which differs from the first threshold value, thereby forming an undulated pattern and, at the same time, the temperature detected by the temperature sensor reaches a predetermined temperature at which the motor would be abnormally heated.

* * * * *